United States Patent [19]

Kuijk

[11] Patent Number: 5,032,830
[45] Date of Patent: Jul. 16, 1991

[54] ELECTRO-OPTICAL DISPLAY DEVICE WITH NON-LINEAR SWITCHING UNITS WITH AUXILIARY VOLTAGES AND CAPACITIVELY COUPLED ROW ELECTRODES

[75] Inventor: Karel E. Kuijk, Eindhoven, Netherlands

[73] Assignee: U.S. Philips Corporation, New York, N.Y.

[21] Appl. No.: 397,148

[22] Filed: Aug. 22, 1989

[30] Foreign Application Priority Data

Sep. 1, 1988 [NL] Netherlands .......................... 8802155

[51] Int. Cl.[5] .............................................. G09G 3/36
[52] U.S. Cl. ..................................... 340/784; 340/719
[58] Field of Search ............... 340/763, 765, 783, 784, 340/785, 787, 788, 805; 350/332, 333; 358/230, 236

[56] References Cited

U.S. PATENT DOCUMENTS

| | | | |
|---|---|---|---|
| 4,641,135 | 2/1987 | Hilbrink | 340/718 |
| 4,731,610 | 3/1988 | Baron et al. | 340/784 |
| 4,810,059 | 3/1989 | Kuijk | 340/784 |

Primary Examiner—Jeffery A. Brier
Attorney, Agent, or Firm—Robert J. Kraus

[57] ABSTRACT

In a picture display device driven with an active matrix in which the selection lines (11) are capacitively coupled to electrodes (6) of the picture elements, the voltage across these picture elements is accurately adjusted by discharging or charging the associated capacitances first to beyond the range of transition (22) in the transmission/voltage characteristic.

23 Claims, 4 Drawing Sheets

ELECTRO-OPTICAL DISPLAY DEVICE WITH NON-LINEAR SWITCHING UNITS WITH AUXILIARY VOLTAGES AND CAPACITIVELY COUPLED ROW ELECTRODES

BACKGROUND OF THE INVENTION

The invention relates to a display device comprising an electro-optical display medium between two supporting plates provided with electrodes, a system of picture elements at the area of picture electrodes arranged on a first supporting plate on the side of the display medium arranged in rows and columns, said first supporting plate also being provided with a system of row and column electrodes for presenting selection and data signals by means of which a range of voltages dependent on the electro-optical display medium can be presented across the picture elements for the purpose of picture display, said row electrodes being capacitively coupled to the picture electrodes.

A display device of this type is suitable for displaying, for example, alphanumerical information and video information by means of passive electro-optical display media such as liquid crystals, electrophoretic suspensions, electrochromic materials, etc.

A device of the type mentioned in the opening paragraph is described in "SPIE Vol. 765 Imaging Sensors and Displays" (1987).

A memory action is obtained in this device by using a switching unit (MIM element) per picture element so that the information presented to a driven row remains present across a picture element to a sufficient extend during the period when the other row electrodes are driven; the loss of information (due to leakage currents) is also limited by the capacitive coupling between the row electrodes and the picture electrodes.

However, the use of such display devices in television systems may present problems. In a conventional drive system for television such as the PAL (NTSC) system approximately 575 (525) lines are written during each frame of 1/25 sec. (1/30 sec.), which lines are distributed over an even and an odd field of approximately 288 (265) lines each per 1/50 (1/60) sec. To inhibit degradation of the liquid crystal material it is preferably alternately driven with a negative and a positive voltage across the liquid crystal. For a display screen with approximately 288 (265) lines it is possible to drive the picture cells with the information presented during the odd field period and subsequently drive them with the information presented during the even field period, the voltage across the picture cell during the odd field period having a different polarity than during the even field period. In this case interlacing does not take place but the second picture line is written over the first picture line, the fourth over the third, and so forth. Information of the same polarity presented to a pixel is refreshed every 1/50 sec. (1/60 sec.) and changes polarity. The number of picture lines on the screen is actually only half the total number of lines of the two fields. However, to write a complete picture of 575 (525) lines the picture information must be presented in an interlaced manner so that the information of opposite polarity is not refreshed after 1/50 (1/60) sec. but after 1/25 (1/30) sec. while information of the same polarity is presented every 2/25 (1/15) sec. Since the picture cells are now driven with the same (positive or negative) voltages for a longer time, this information may be partly lost due to the said leakage currents (notably at higher temperatures because the leakage currents then increase). Due to inequalities between positive and negative information flicker may also occur in the picture at a frequency of 25/2 (15) Hz.

SUMMARY OF THE INVENTION

The present invention has for its object, inter alia to provide a display device of the type described in the opening paragraph which can be driven by means of the PAL (NTSC) system without the picture quality seriously deteriorating due to the said leakage currents or flicker.

To this end a display device according to the invention is characterized in that the picture electrodes are connected in an electrically conducting manner to the common point of two non-linear two-pole switching units which are arranged in series between a column electrode for data signals and an electrode for a reference voltage by means of which an auxiliary voltage can be applied across the picture elements prior to selection.

In this Application a non-linear two-pole switching unit is in the first instance understood to mean a switching element which is conventional in the technology for the manufacture of the said display devices, such as, for example a pn diode, Schottky diode, pin diode in, for example, crystalline, polycrystalline or amorphous silicon, CdSe or another semiconductor material, although other non-linear two-pole switching units are not excluded such as, for example MIMs or bipolar transistors with short-circuited base-collector junction or MOS transistors whose gates are interconnected to the drain zones.

Combinations of such elements are also possible which give the unit, for example a certain extent of redundancy.

The auxiliary voltage is preferably beyond or on the limit of the range of transition in the transmission/voltage characteristic of the electro-optical medium.

The auxiliary voltage is presented, for example via a fixed reference voltage so that all picture elements in a row are first charged negatively or positively to a fixed value and are subsequently charged or discharged to the correct value, dependent on the data signals presented.

Discharging and charging prior to the actual driving operation with the picture information can be effected during the same line period in which the picture information is presented, but also during the preceding line period.

Since each row of picture elements is now separately written, the voltage across these picture elements can also be inverted per row, which leads to a higher face-flicker frequency and hence to a steadier picture.

It is to be noted that the method of negatively charging too far, prior to the accurate adjustment of the voltage across the capacitances associated with the picture elements has already been proposed in the non-prepublished Dutch application No. 8701420 in the name of the applicant and its corresponding U.S. application Ser. No. 208185, filed on June 16, 1988.

However, in the device described in these applications row electrodes comprise structured transparent metal layers (for example, of indium tin oxide) provided on the inner side of the second supporting plate. Problems may occur in the manufacture of such a device, notably in a device for colour display when colour filters are provided. Presence of the colour filter on the electrodes leads to an extra capacitive voltage drop, all the more so because most procedures for manufacturing colour filters lead to rather thick colour filters (>1 μm). Moreover, the filter layers are not flat in practice, which has a detrimental influence on the operation of the device.

It is true that a flat surface may be obtained by providing the colour filters under the electrodes, but it is generally difficult to structure the double layer of colour filter and indium tin oxide.

In contrast to this, one unstructured counter electrode is sufficient in a device according to the invention, so that colour filters can be provided under this counter electrode without any difficulty.

A preferred embodiment of a device according to the invention is therefore characterized in that the second supporting plate is provided with a colour filter arranged between the supporting plate and a common counter electrode covering the colour filter.

BRIEF DESCRIPTION OF THE DRAWINGS

The invention will now be described in greater detail by way of example with reference to the accompanying drawings in which.

DETAILED DESCRIPTION OF THE INVENTION

Figure 1:
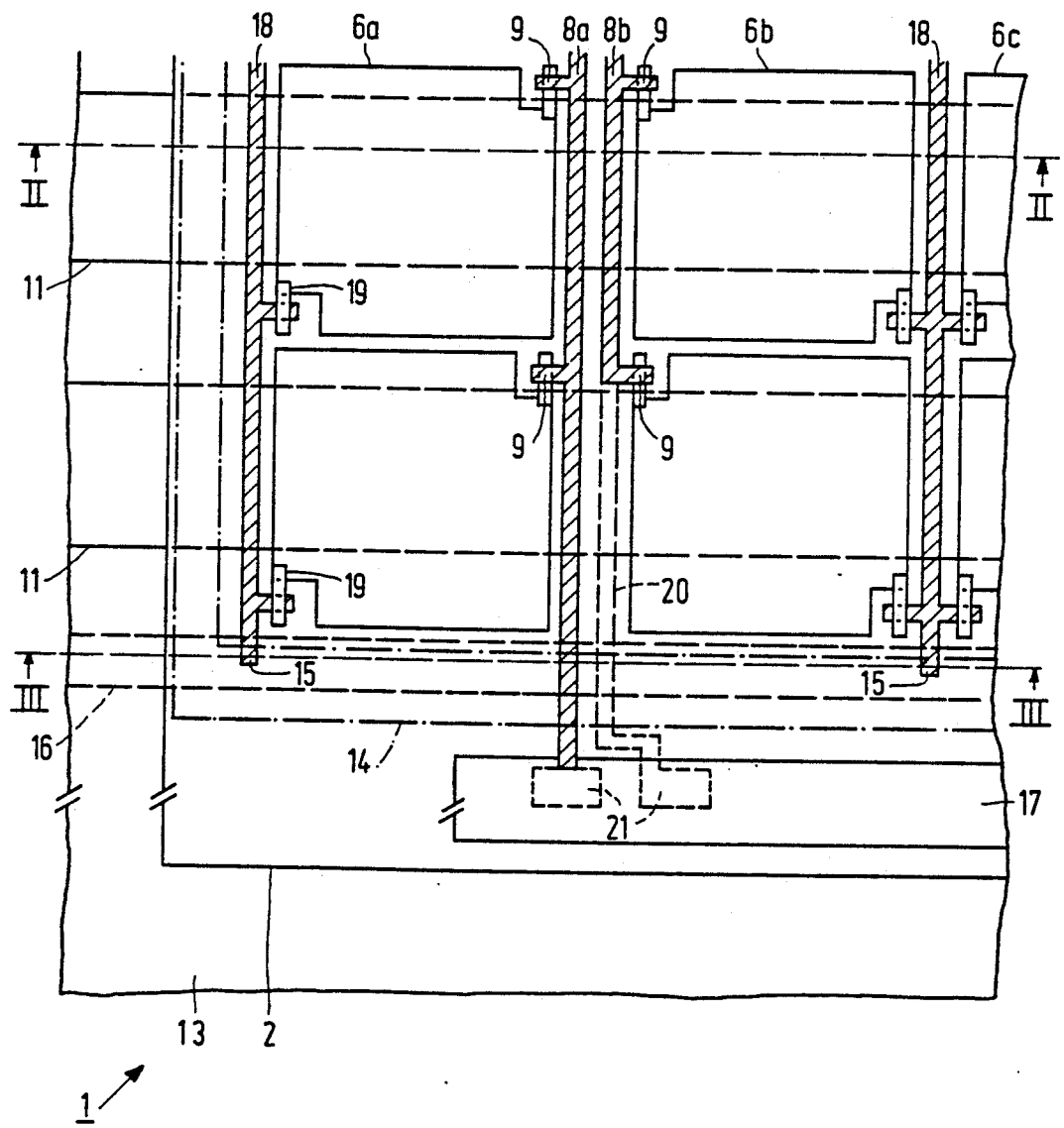
FIG. 1 is a diagrammatic plan view of a part of a device according to the invention.
Figure 2:
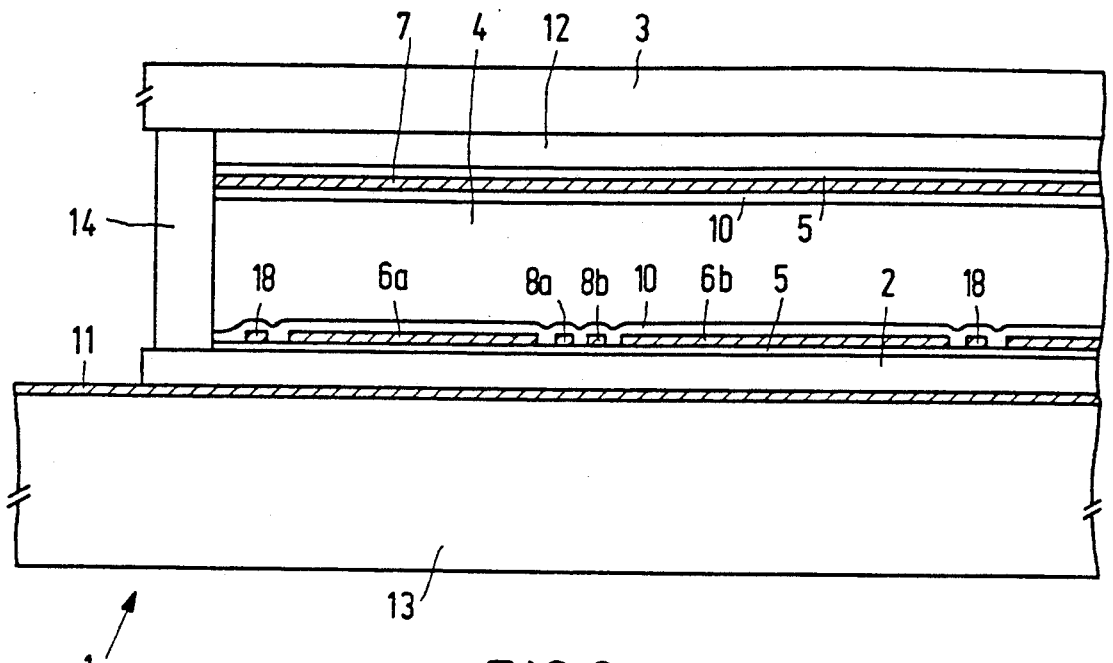
FIGS. 2 and 3 are diagrammatic cross sections taken on the line II—II and III—III in FIG. 1.
Figure 3:
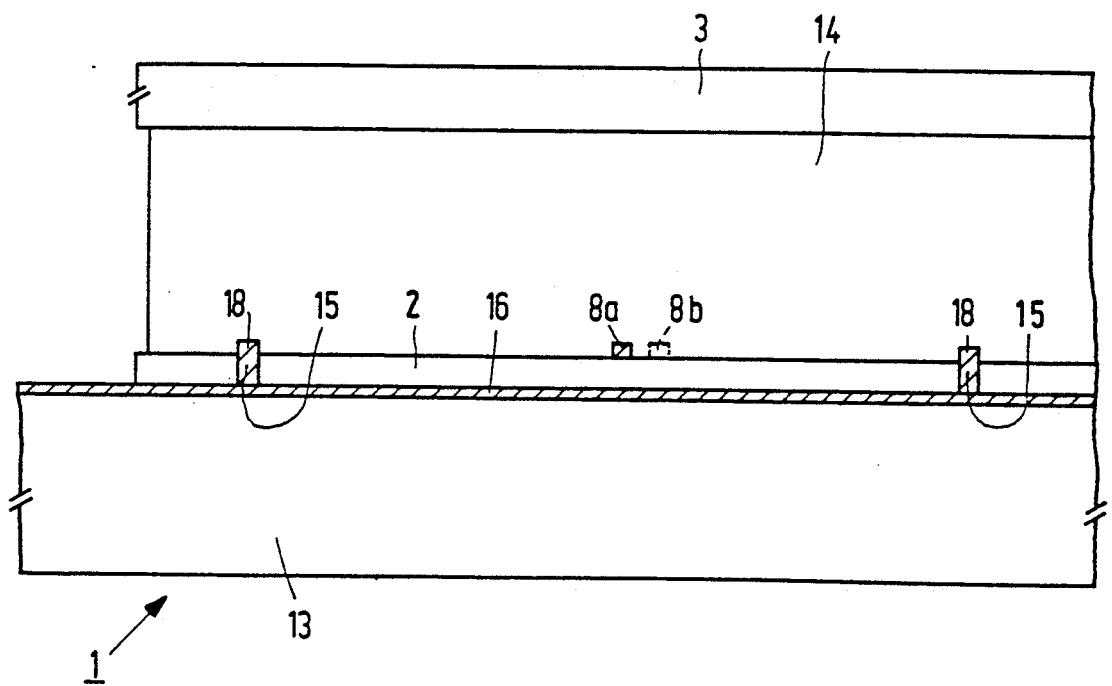

FIGS. 1, 2 and 3 show in a diagrammatic plan view and in a cross-section a part of a display device, in this embodiment a liquid crystal display device 1 which has two supporting plates 3 and 13 of, for example quartz or glass, with a substantially uninterrupted thin layer 2 of insulating material, for example vapour-deposited silicon oxide being provided on the supporting plate 13. For example, a twisted nematic or a ferro-electric liquid crystalline material 4 is present between the supporting plates. The inner surfaces of the supporting plate 3 and the insulating layer 13 have electrically and chemically insulating protective layers 5. A plurality of row and column-arranged picture electrodes 6 of indium tin oxide or another electrically conducting transparent material is provided on the layer 2. A transparent electrode 7 of, for example indium tin oxide, functioning as a counter electrode is present on the supporting plate 3. A colour filter 12 is arranged between the counter electrode 7 and the supporting plate 3, which filter is divided into, for example a pattern of red, green and blue filters being triangular, square-shaped or, for example hexagonal. The picture electrodes 6 define the picture elements of the display device.

Strip-shaped (for example metal) column electrodes 8 are arranged between the columns of picture electrodes 6. Each picture electrode 6 is connected to a column electrode 8 by means of a diode 9 digrammatically shown in FIG. 2. As is apparent from FIG. 1, the associated column electrodes 8a, 8b are arranged between two picture electrodes 6a, 6b. The device also comprises liquid crystal orienting layers 10. As is known, another orientation state of the liquid crystal moleculaes and hence an optically different state can be obtained by applying a voltage across the liquid crystal layer 4. The display device may be realised as a transmissive or a reflective device and may be provided with one or two polarisers. To be able to select a row of picture elements the device comprises row electrodes or selection lines 11 on the supporting plate 13 between this plate and the insulating layer 2, which selection lines are capacitively coupled to the picture electrodes 6 in this embodiment (with the insulating layer 2 as dielectric layer).

According to the invention auxiliary electrodes 18 which have two columns of picture electrodes 6 in common in this embodiment (with the exception of those at the edge) and which are arranged on the side of the picture electrodes 6 different from that of the column electrodes 8 are also present between the columns of picture electrodes 6. The auxiliary electrodes 18 connect the picture electrodes 6 to a reference voltage via diodes 19 shown diagrammatically in FIG. 1.

The liquid crystal material 4 is enclosed by an edge 14 denoted by a dot-and-dash line in FIG. 1. A part of the supporting plate 13 may extend outside this edge 14, which part is free, for example for providing drive electronics such as shift registers for storing picture information to be displayed.

In the embodiment shown the auxiliary electrodes 18 are connected at one end of the matrix of picture elements through interconnections 15 to a connection electrode 16 which connects the auxiliary electrodes to a reference voltage. Like the row electrodes 11, the connection electrode 16 is present under the insulating layer 2 on the supporting plate 13 so that no provisions need to be made on the layer 2 for presenting the reference voltage. The bare part of the supporting plate 13 is now, for example entirely available (at least in the direct vicinity of the edge 14) for integrated circuits 17 (for example shift registers) for storing and presenting picture information. The information can be presented via the circuit 17 and the column electrodes 8a and comparable column electrodes to the (odd) columns of picture elements 9a, 9c, ..., while information for the (even) columns of picture elements (9b and comparable picture elements) is presented by a similar circuit (not shown) on the opposite side of the matrix via the column electrode 8b and comparable column electrodes.

On the other hand the electrodes 8a, 8b may also be formed on both sides if this is desirable with a view to redundancy. This is shown diagrammatically in FIGS. 1, 3 by means of the broken line 20.

However, this is at the expense of the number of required connection contacts 21 and their mutual pitch, which without this measure is approximately double the width of a picture element in the device of FIG. 1.

The integrated circuit 17 may be provided, for example by means of chip-on-glass techniques.

The supporting plate 13 and the layer 2 may be transparent, for example in a transmissive display device. The parts of the row electrodes 11 projecting beyond the edge 14 may be provided with a metal layer, which facilitates contacting and reduces the series resistance. If the device 1 is formed as a reflective display device, the electrodes 11 may be entirely formed as metal tracks. Similar remarks apply to the auxiliary electrodes 18 for the reference voltage. The reference voltage is chosen to be such that, dependent on the voltages used on the selection line 11 and the electro-optical material used, the capacitance associated with the picture element can always be discharged to a voltage value beyond or on the limit of the transition range in the transmission/voltage characteristic of the relevant electro-optical material.

Figure 4:
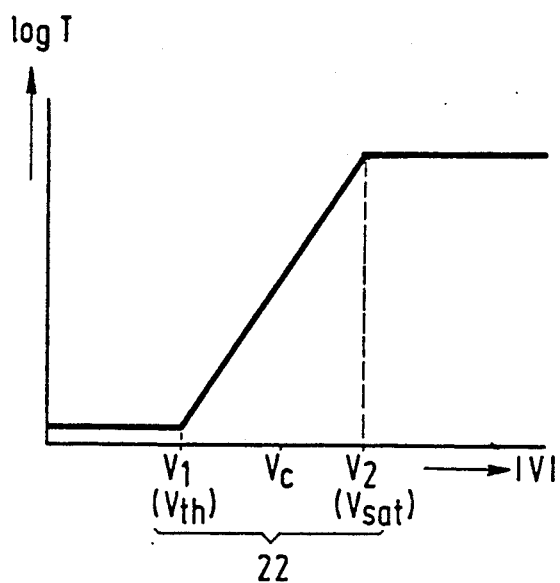
FIG. 4 shows diagrammatically a transmission/voltage characteristic.

FIG. 4 shows diagrammatically a transmission/voltage characteristic of a display cell as it occurs in the display device of FIGS. 1, 2. Below a given threshold voltage (V1 or Vth) the cell substantially passes no light, whereas above a given saturation voltage (V2 or Vsat) the cell is substantially entirely transparent. The intermediate range constitutes the above-mentioned range of transition and is indicated in FIG. 4 by means of a brace 22. In this respect it is to be noted that the absolute value of the voltage is plotted on the abscissa, because such cells are usually driven at an alternating voltage.

Figure 5:
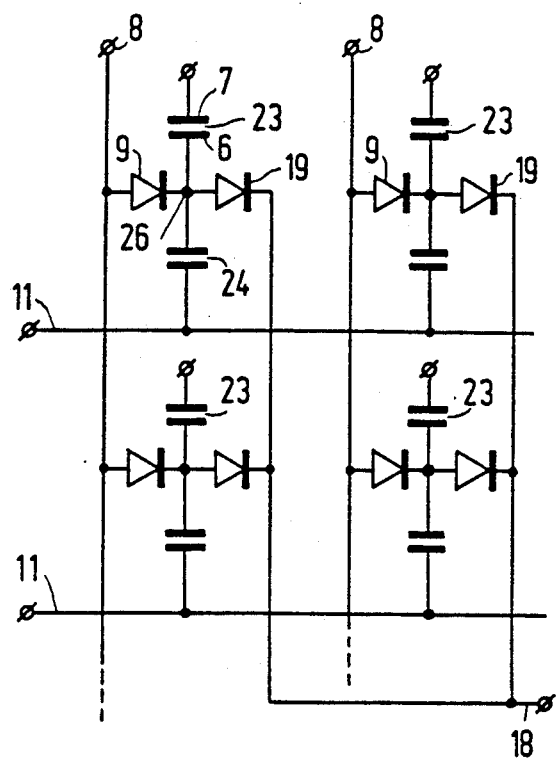
FIG. 5 shows diagrammatically a part of the display device according to FIGS. 1, 2, 3 while FIGS. 6a, 6b, and 6c a show number of possible drive signals

FIG. 5 shows diagrammatically the display device of FIGS. 1, 2 and 3.

The picture elements 23 arranged in accordance with a matrix and formed at the area of the picture electrodes 6 are capacitively coupled to row electrodes 11 via the picture electrodes 6, which row electrodes, together with column electrodes 8 are arranged in the form of a matrix. The picture electrodes 6 of the picture elements 23 are connected to column electrodes 8 via diodes 9. They are also connected via diodes 19 to an auxiliary electrode 18, which, except along the edges in the embodiment of FIG. 1 is each time common to two diodes 19. The capacitive coupling between the picture electrodes 6 and the row electrodes 18 is diagrammatically shown in FIG. 5 by means of capacitances 24.

For writing information a first selection voltage Vs1 is presented on a selection line 11 during a selection period ts while the information or data voltages Vd are simultaneously presented on the column electrodes 8; after presenting a voltage Vns on the selection line 11, this leads to a voltage across a picture element 12 which represents the information presented.

To prevent degradation of the liquid crystal and to be able to increase the so-called face-flicker frequency, information having an alternating sign is preferably presented across the picture element 23. In a device according to the invention this is achieved by presenting a second selection voltage Vs2 on the selection line 11 while simultaneously presenting inverted data voltages (−Vd) and subsequently presenting Vns on the selection line 11 after having discharged the capacitance associated with the picture element 23 too far (or having negatively charged it too far).

FIG. 6 shows how the drive signals are chosen for the device according to the invention in order to write them with picture information which changes sign during each field (for example in TV applications).

From the instant t0 (see FIG. 6a) a selection voltage Vs1 is presented on a selection line (row electrode) 11 during a selection period ts (which in this example is chosen to be equal to a line period for TV applications, namely 64 μsec) while information voltages or data voltages Vd are simultaneously presented on the column electrodes 8. After the instant t1 the row of picture elements 12 is no longer selected because the row electrode 11 receives a voltage Vns. This voltage is maintained until just before the next selection of the relevant picture elements 23. In this example this is effected by giving the selection line 11 a reset voltage Vres just before selecting the row of picture elements again, namely at an instant t2=tf−ts in which tf represents a field period. The reset voltage Vres and a reference voltage Vref presented on the common point of the diodes 9, 19 can then be chosen to be such that the ultimate voltage across the row of picture elements lies beyond the range to be used for picture display. In a subsequent selection period (from t3) they are then charged to the desired value determined by data voltages −Vd. To this end the row electrodes receive the voltage Vs2 and after the selection period (after t4) has elapsed, they receive the non-selection voltage Vns again. In this way the voltage across the picture elements is inverted during each field period.

Figure 6A:
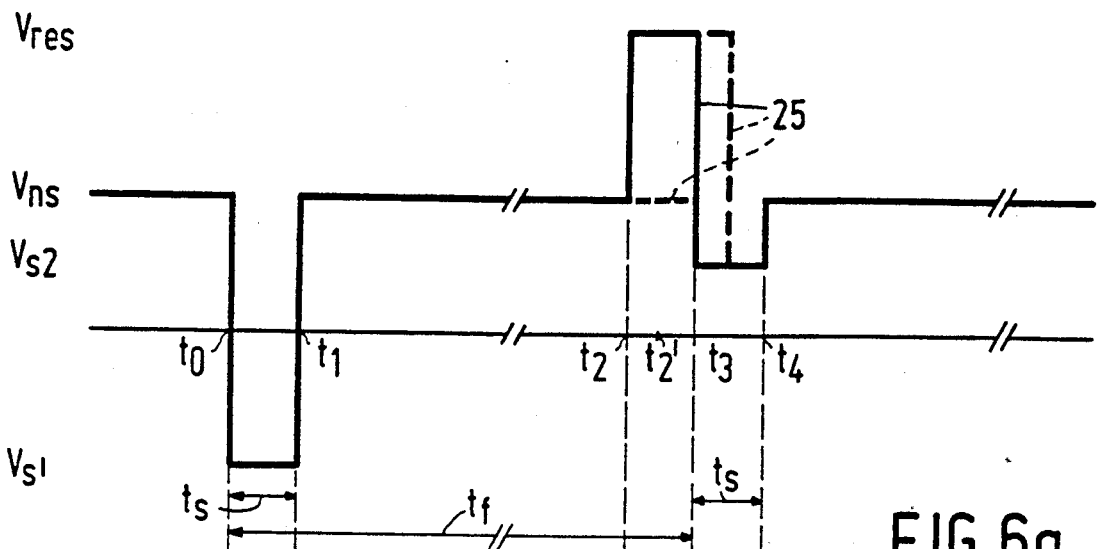
Figure 6B:
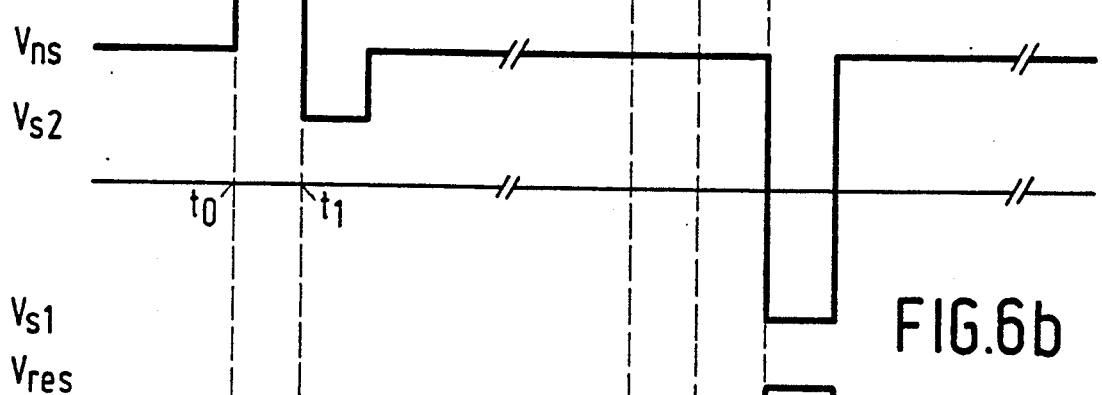
Figure 6C:
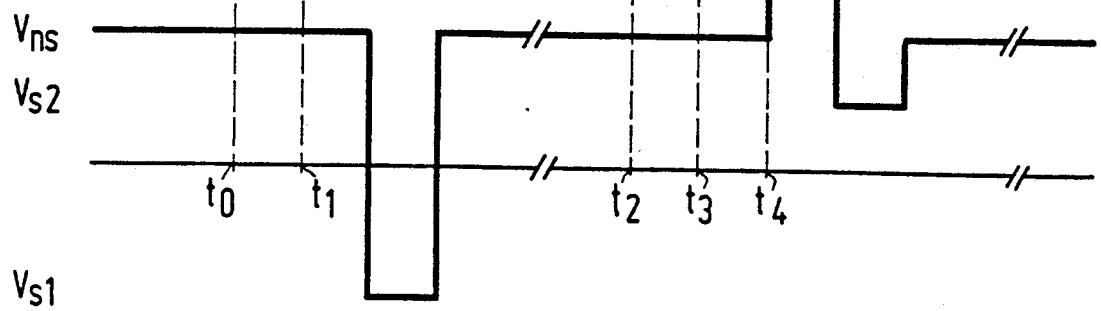

FIG. 6b shows the same voltage variation as FIG. 6a, but shifted over a field period plus a selection period (in this case a line period). This provides the possibility of writing two successive rows of picture elements with inverse data voltages with respect to each other. FIG. 6c is identical to FIG. 6a, but shifted over two selection periods.

For (television) pictures with half the vertical resolution in which the lines of the even and the odd field are written over each other, it is achieved that the picture information changes its sign and is refreshed once per field period. Although the line-flicker frequency is 25 Hz (30 Hz) in this case, a face-flicker frequency of 50 Hz (60 Hz) is achieved between successive rows due to the phase difference of 180° introduced by changing the sign per row.

The device shown is very suitable for using a drive method in which $$Vc = \frac{Vsat + Vth}{2}$$

is chosen for the average voltage across a picture element (see FIG. 4) so that the absolute value of the voltage for the purpose of picture display across the picture elements 12 is substantially limited to the range between Vth and Vsat.

It will be shown hereinafter that the device can be driven by using the following values of Vd, Vs1, Vs2, Vns, Vres and Vref:

$$-1/2(Vsat - Vth) \leq Vd \leq 1/2(Vsat - Vth)$$

$$Vs1 = -\left(\frac{a+1}{a}\right)Von - \left(\frac{a+1}{a}\right)1/2(Vsat + Vth) - \frac{Vce}{a}$$

$$Vs2 = -\left(\frac{a+1}{a}\right)Von + \left(\frac{a+1}{a}\right)1/2(Vsat + Vth) - \frac{Vce}{a}$$

$$Vns = Vce = 1/2(Vsat - Vth) + Vsat$$
$$Vref = 1/2(Vsat - Vth) + 2\,Vsat$$

$$Vres = \left(\frac{a+1}{a}\right)Vref +$$

$$\left(\frac{a+1}{a}\right)Von + \left(\frac{a+1}{a}\right)Vsat - \frac{Vce}{a}$$

in which:
Von is the forward voltage of the diodes 9, 19 and
Vce is the voltage at the counter electrode 7, while $a = C_{ex}/C_p$ in which $C_{ex}$ is the value of the capacitance 24 and $C_p$ is the average capacitance value of the picture element 23.

To clarify this, $C_e$ is first assumed to $>> C_p$ so that $$\frac{a+1}{a} \approx 1 \text{ and } \frac{Vce}{a}$$

are negligible.

During selection of a row of picture elements 23 (instant t0) the associated row electrode 11 is given a selection voltage $Vs1 = -Von - \frac{1}{2}(Vsat+Vth)$. The voltage across the capacitance 24 associated with such a picture element 23 then becomes $Vd - Von - Vs1 = Vd + \frac{1}{2}(Vsat + Vth)$.

At the instant t1 the voltage at the row electrode 11 will be $Vns = Vce$. Since $Ce >> Cp$, the capacitive coupling between the row electrode 11 and the picture element 6 is substantially ideal so that the voltage $V_A$ at the point 26 (FIG. 5) becomes $Vce + Vd + \frac{1}{2}(Vsat + Vth)$. A voltage $V_A - Vce = Vd + \frac{1}{2}(Vsat + Vth)$ is then present across picture element 23.

A satisfactory operation as regards grey scales is obtained if, dependent on Vd, this value is at least Vth and at most Vsat. It follows from $Vd + \frac{1}{2}(Vsat+Vth) \geq Vth$ that $Vd \geq -(\frac{1}{2}Vsat - Vth)$ and it follows from $$Vd + \frac{1}{2}(Vsat+Vth) \leq Vsat \text{ that } Vd \leq \frac{1}{2}(Vsat-Vth).$$

At the instant t2 the row electrode 11 receives a reset voltage $Vres = Vref + Von + Vsat$. Due to the capacitive coupling the voltage $V_A$ at the point 26 will be a value of $(Vres - Vns)$ higher so that $V_A$ would be equal to $Vd + \frac{1}{2}(Vsat + Vth) + Vref + Von + Vsat$. Since this voltage is larger than $Vref + Von$, diode 19 starts conducting until $V_A(t2') = Vref + Von$.

From t3 the row electrode receives a selection voltage $Vs2 = -Von + \frac{1}{2}(Vsat + Vth)$. Due to the capacitive coupling the voltage $V_A$ is first decreased by $(Vres - Vs2)$ to:

$$V_A(t3) = Vref + Von - Vres + Vs2 =$$
$$Vref + Von - Vref - Von - Vsat - Von +$$
$$1/2(Vsat + Vth) - Von - 1/2(Vsat - Vth)$$

The voltage across the picture element then is:

$$V_A - Vce = -Von - (Vsat - Vth) - Vsat = -Von - 2Vsat + Vth$$

Since $|Vth| < |Vsat|$ it holds that $V_A - Vce \leq -Von - Vsat$ so that the picture element is negatively charged too far.

From the instant t3 new information with the opposite sign $-Vd$ is also presented. With a selection voltage of $Vs2 = -Von + \frac{1}{2}(Vsat + Vth)$ this results in a voltage $-Vd - Von - Vs2 = -Vd - \frac{1}{2}(Vsat + Vth)$ across the capacitance 24. At the instant t4 the voltage at the row electrode 11 becomes $Vns = Vce$ again. Due to the substantially ideal capacitive coupling the voltage $V_A$ at the point 26 now becomes $Vce - Vd - \frac{1}{2}(Vsat + Vth)$; the voltage across the picture element 23 becomes $V_A - Vce$, i.e. $-Vd - \frac{1}{2}(Vsat + Vth)$. This voltage is between the values $-Vsat$ and $-Vth$, dependent on Vd so that a voltage with the opposite sign is now present across the picture element 23.

The values for Vns and Vref follow from the condition that the diodes 9, 19 must not conduct during non-selection. For the minimum and maximum voltage at the point 26 it holds that:

$$V_{Amin} = Vce - Vsat,$$
$$V_{Amax} = Vce + Vsat$$

Diode 9 does not conduct if $V_{Amin} \geq Vdmax$ $$Vce - Vsat \geq \frac{1}{2}(Vsat - Vth)$$

or $$Vce \geq \frac{1}{2}(Vsat - Vth) + Vsat$$

Diode 19 does not conduct if $V_{Amax} \leq Vref$ $$Vce + Vsat \leq Vref$$

or $$Vref \geq \frac{1}{2}(Vsat - Vth) + 2Vsat$$

It follows for the reset voltage Vres that:

$$Vres \geq \frac{1}{2}(Vsat - Vth) + Vsat + Von$$

Let it be assumed that, in contrast to the foregoing assumption, the capacitive coupling is not substantially ideal. The voltage jump at the point 26 at the instant t1 is then not $\Delta V (= Vns - Vs1)$ but due to capacitive division it is $$\frac{Cex/Cp}{1 + Cex/Cp} \Delta V = \frac{a}{a+1} \Delta V$$

This means that the voltage jump, which is necessary to charge the point 26 to a sufficient extent, must be chosen to be $a + 1/a$ larger. If $$Vs1 = -\frac{a+1}{a} Von - \frac{a+1}{a} 1/2(Vsat + Vth) - \frac{Vce}{a}$$

and $Vns1 = Vce$, the jump $$(Vns1 - Vs1) = Vce\left(\frac{a+1}{a}\right) + \left(\frac{a+1}{a}\right)Von +$$
$$\frac{a+1}{a} \cdot 1/2 \cdot (Vsat + Vth)$$
$$= \frac{a+1}{a}(Vce + Von + 1/2(Vsat + Vth))$$

At the point 26 is reduced by a factor $a/a + 1$ to $Vce + Von + \frac{1}{2}(Vsat + Vth)$. The voltage at this point was dependent on the presented data voltage Vd during ts: $Vd - Von$ and will now become $Vd + Vce - \frac{1}{2}(Vsat + Vth)$ at instant $V_A(t1)$ so that the voltage across the display element 24 becomes equal to $V_A - Vce = Vd + \frac{1}{2}(Vsat + Vth)$; as in the previous case $(a + 1/a \approx 1)$ it ranges between Vth and Vsat, dependent on Vd. With a reset voltage $$V_{res} = \left(\frac{a+1}{a}\right)V_{ref} + \left(\frac{a+1}{a}\right)V_{on} + \frac{a+1}{a}V_{sat} - \frac{V_{ce}}{a}$$

the jump (Vres−Vns) at the row electrode 11 at the point 26 is reduced to a/a+1(Vres−Vns)=Vref+Von+Vsat−Vce at instant t2 so that the new voltage at point 26 will be:

$V_A(t2) = Vref + Von + Vsat − Vce + Vd + Vce + \frac{1}{2}(-Vsat + Vth) = Vref + Von + Vsat + Vd + \frac{1}{2}(-Vsat + Vth)$ This voltage is sufficiently high to cause the diode 19 to conduct; the point 26 is thereby discharged to a value $V_A(t2') = Vref + Von$.

At the instant t3 the voltage at the row electrode 11 changes from Vres to $$Vs2 = -\left(\frac{a+1}{a}\right)Von + \left(\frac{a+1}{a}\right)1/2(Vsat + Vth) - \frac{Vce}{a}$$

The voltage jump $$-(Vres - Vs2) = \left\{\left(\frac{a+1}{a}\right)Vref + \left(\frac{a+1}{a}\right)Von + \left(\frac{a+1}{a}\right)Vsat - \frac{Vce}{a} + \left(\frac{a+1}{a}\right)1/2(Vsat + Vth) + \frac{Vce}{a} + \frac{a+1}{a}Von\right\}$$

is reduced at point 26 by a factor of a/a+1 to ΔV = −Vref−2Von−Vsat+½(Vsat+Vth) and due to this voltage jump the voltage value at point 26 changes from $V_A(t2') = Vref+Von$ to $V_A(t3) = -Von-Vsat+\frac{1}{2}(Vsat+Vth) = -Von-\frac{1}{2}(Vsat-Vth)$. The voltage across the picture element 24 becomes $$V_A - Vce = -Von - 1/2(Vsat - Vth) - 1/2(Vsat - Vth) - Vsat$$
$$= -Von - 2\,Vsat + Vth.$$

so that also the picture element 24 is negatively charged too far again.

From t3, however, diode 19 can conduct again and the point 26 acquires a value Vd−Von dependent on the data voltage which has been presented. The subsequent voltage jump (Vns−Vs2) at instant t4 is $$\left(\frac{a+1}{a}\right)Von - \left(\frac{a+1}{a}\right)1/2(Vsat + Vth + \frac{a+1}{a}Vce$$

and due to the capacitive division it is reduced at point 26 to Von−½(Vsat+Vth)+Vce and the voltage at point 26 becomes:

$V_A(t4) = Vd + Vce - \frac{1}{2}(Vsat + Vth).$

A voltage $V_A - Vce = Vd - \frac{1}{2}(Vsat+Vth)$ which ranges between −Vsat and −Vth is then present across the picture element 24.

Figure 7:
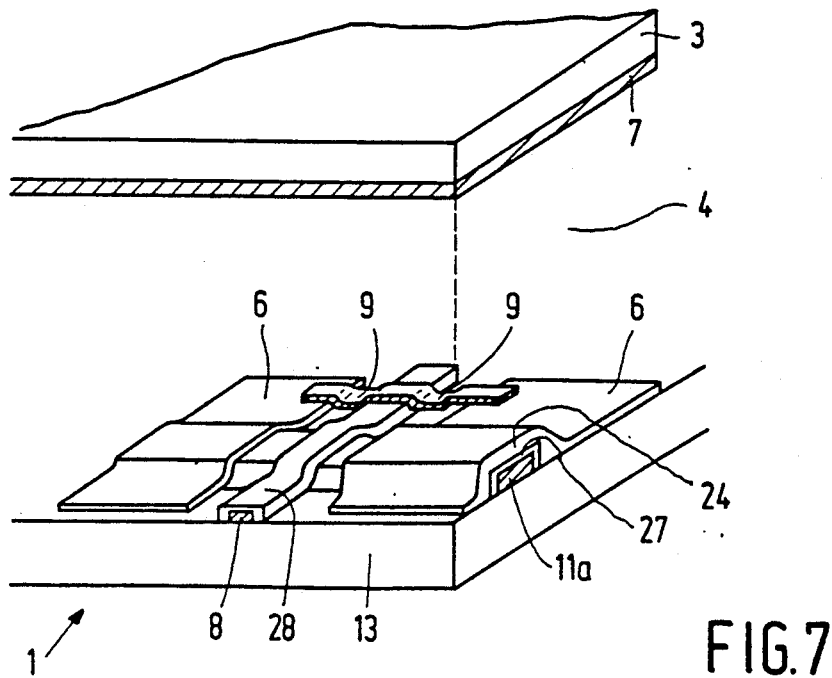
FIG. 7 shows diagrammatically a modification of the display device according to FIGS. 1, 2, and 3.

The invention is of course not limited to the embodiment shown. For example, the device of FIG. 7 shows diagrammatically a part in which the extra capacitance 24 is constituted by the combination of picture electrode 8, isolator 27 and column electrode 11.

The other reference numerals in FIG. 6 have the same significance as those in FIGS. 1 to 3. At the area of through-connections the column electrodes are mutually electrically insulated by means of an insulating layer 28.

Non-linear switching elements other than diodes 9, 19 may be used, or a plurality of switching elements (for redundancy) may be used as described in the non-prepublished Netherlands patent application No. 8800204 in the name of the Applicant.

The selection voltages Vs1 and Vs2 can of course also be chosen to be shorter than one line period (64 μsec). In this case the reset voltage may alternatively be presented during a part of the line period in which selection takes place, provided there is sufficient time left to charge the capacitances 24. The voltage variation at the electrodes 11 is then effected, for example in the way as is shown diagrammatically in FIG. 6a by means of the broken line 25.

I claim:

1. A display device comprising an electro-optical display medium between two supporting plates provided with electrodes, a system of picture elements at the area of picture electrodes arranged on a first supporting plate on the side of the display medium arranged in rows and columns, said first supporting plate also being provided with a system of row and column electrodes for presenting selection and data signals by means of which a range of voltages dependent on the electro-optical display medium can be presented across the picture elements for the purpose of picture display, said row electrodes being capacitively coupled to the picture electrodes, which are connected in an electrically conducting manner to the common point of two non-linear two-pole switching units which are arranged in series between a column electrode for data signals and an electrode for a reference voltage by means of which an auxiliary voltage can be applied across the picture elements prior to selection.

2. A display device as claimed in claim 1, wherein the auxiliary voltage is beyond or on the limit of the range of transistion in the transmission/voltage characteristic of the electro-optical medium.

3. A display device as claimed in claim 1, wherein the non-linear two-pole switching units are diodes.

4. A display device as claimed in claim 1, wherein that in a row of picture electrodes each time two juxtaposed picture electrodes are connected via a non-linear two-pole switching unit to a common electrode for a reference voltage, which electrode is located between the picture electrodes.

5. A display device as claimed in claim 1, wherein a substantially uninterrupted layer of insulating material is provided between the row electrodes and the picture electrodes.

6. A display device as claimed in claim 1, wherein the second supporting plate is provided with a colour filter arranged between the supporting plate and a common counter electrode covering the colour filter.

7. A display device as claimed in claim 1 wherein the electro-optical medium comprises a liquid crystalline material.

8. A display device as claimed in claim 7, wherein the electro-optical medium comprises a ferro-electric liquid crystalline material.

9. A display device as claimed in claim 2, wherein the non-linear two-pole switching units are diodes.

10. A display device as claimed in claim 2, wherein that in a row of picture electrodes each time two juxtaposed picture electrodes are connected via a non-linear two-pole switching unit to a common electrode for a reference voltage, which electrode is located between the picture electrodes.

11. A display device as claimed in claim 3, wherein that in a row of picture electrodes each time two juxtaposed picture electrodes are connected via a non-linear two-pole switching unit to a common electrode for a reference voltage, which electrode is located between the picture electrodes.

12. A display device as claimed in claim 2, wherein a substantially uninterrupted layer of insulating material is provided between the row electrodes and the picture electrodes.

13. A display device as claimed in claim 3, wherein a substantially uninterrupted layer of insulating material is provided between the row electrodes and the picture electrodes.

14. A display device as claimed in claim 4, wherein a substantially uninterrupted layer of insulating material is provided between the row electrodes and the picture electrodes.

15. A display device as claimed in claim 2, wherein the second supporting plate is provided with a colour filter arranged between the supporting plate and a common counter electrode covering the colour filter.

16. A display device as claimed in claim 3, wherein the second supporting plate is provided with a colour filter arranged between the supporting plate and a common coumnter electrode covering the colour filter.

17. A display device as claimed in claim 4, wherein the second supporting plate is provided with a colour filter arranged between the supporting plate and a common counter electrode covering the colour filter.

18. A display device as claimed in claim 5, wherein the second supporting plate is provided with a colour filter arranged between the supporting plate and a common counter electrode covering the colour filter.

19. A display device as claimed in claim 2, wherein the electro-optical medium comprises a ferro-electric liquid crystalline material.

20. A display device as claimed in claim 3, wherein the electro-optical medium comprises a ferro-electric liquid crystalline material.

21. A display device as claimed in claim 4, wherein the electro-optical medium comprises a ferro-electric liquid crystalline material.

22. A display device as claimed in claim 5, wherein the electro-optical medium comprises a ferro-electric liquid crystalline material.

23. A display device as claimed in claim 6, wherein the electro-optical medium comprises a ferro-electric liquid crystalline material.

* * * * *